(12) United States Patent
Margino et al.

(10) Patent No.: US 9,156,616 B1
(45) Date of Patent: Oct. 13, 2015

(54) DEBRIS COLLECTING CHUTE DEVICE

(71) Applicants: Angelo Margino, Lanoka Harbor, NJ (US); Meghan Margino, Lanoka Harbor, NJ (US)

(72) Inventors: Angelo Margino, Lanoka Harbor, NJ (US); Meghan Margino, Lanoka Harbor, NJ (US)

( * ) Notice: Subject to any disclaimer, the term of this patent is extended or adjusted under 35 U.S.C. 154(b) by 0 days.

(21) Appl. No.: 14/459,811

(22) Filed: Aug. 14, 2014

(51) Int. Cl.
| B65G 11/10 | (2006.01) |
| B65G 11/18 | (2006.01) |
| B65G 11/02 | (2006.01) |
| B65G 11/14 | (2006.01) |

(52) U.S. Cl.
CPC ................ B65G 11/18 (2013.01); B65G 11/02 (2013.01); B65G 11/10 (2013.01); B65G 11/14 (2013.01)

(58) Field of Classification Search
CPC ......... B65G 53/54; B65G 65/00; B65G 11/10
USPC .................. 193/2 R, 15, 25 R, 25 S, 25 C, 30
See application file for complete search history.

(56) References Cited

U.S. PATENT DOCUMENTS

| 1,719,545 | A | * | 7/1929 | Grapp .............................. 193/33 |
| 4,157,103 | A | | 6/1979 | La Fleur |
| 4,752,384 | A | * | 6/1988 | Fauth et al. .............. 198/457.05 |
| 4,955,984 | A | | 9/1990 | Cuevas |
| 5,020,651 | A | * | 6/1991 | Lockett ....................... 193/25 R |
| 5,160,230 | A | | 11/1992 | Cuevas |
| 5,724,701 | A | * | 3/1998 | Jones ............................... 15/304 |
| 6,101,663 | A | | 8/2000 | Greer, Jr. et al. |
| 6,159,273 | A | * | 12/2000 | O'Connor ....................... 95/273 |
| 6,467,124 | B1 | | 10/2002 | Small |
| 6,601,266 | B1 | | 8/2003 | Faraci et al. |
| D590,557 | S | | 4/2009 | Sobo |
| 7,814,609 | B1 | | 10/2010 | Shumway |
| 7,971,698 | B2 | * | 7/2011 | Burstrom et al. ........... 193/25 E |
| 2011/0179597 | A1 | | 7/2011 | Habboush |

FOREIGN PATENT DOCUMENTS

WO    WO9409934    5/1994

* cited by examiner

*Primary Examiner* — James R Bidwell

(57) ABSTRACT

A debris collecting chute device facilitates the collection of debris while repairing sheetrock on a ceiling surface. The device includes a tube having an open top end, an open bottom end and a perimeter surface coupled to and extending between the open top end and the open bottom end. The open bottom end of the tube is configured for positioning over an open top of a waste receptacle. An attachment member has an upper surface and a lower surface. The upper surface of the attachment member is coupled to the open top end of the tube. The lower surface of the attachment member is configured for attaching to a ceiling surface surrounding a damaged area of the ceiling surface.

20 Claims, 4 Drawing Sheets

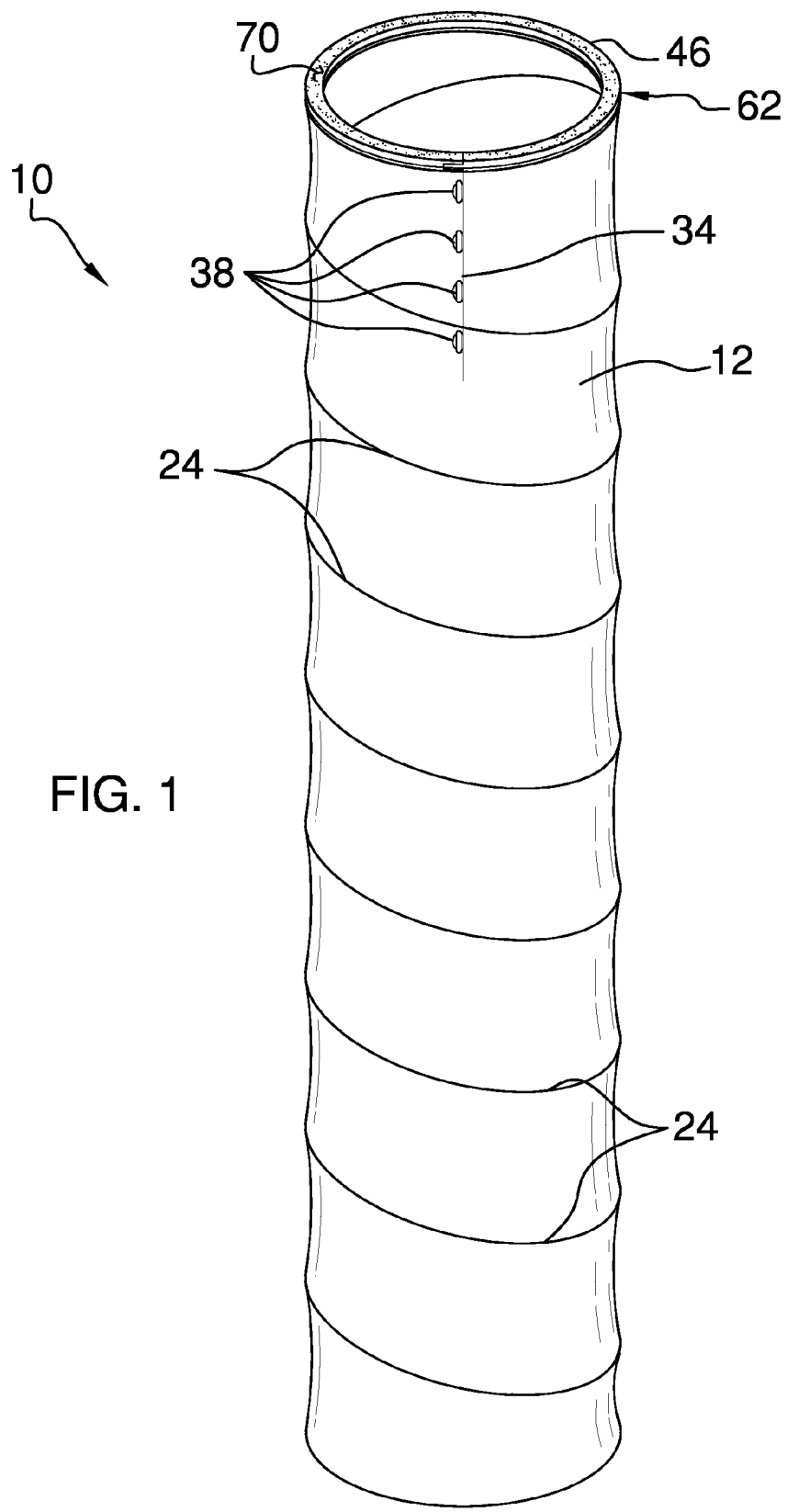

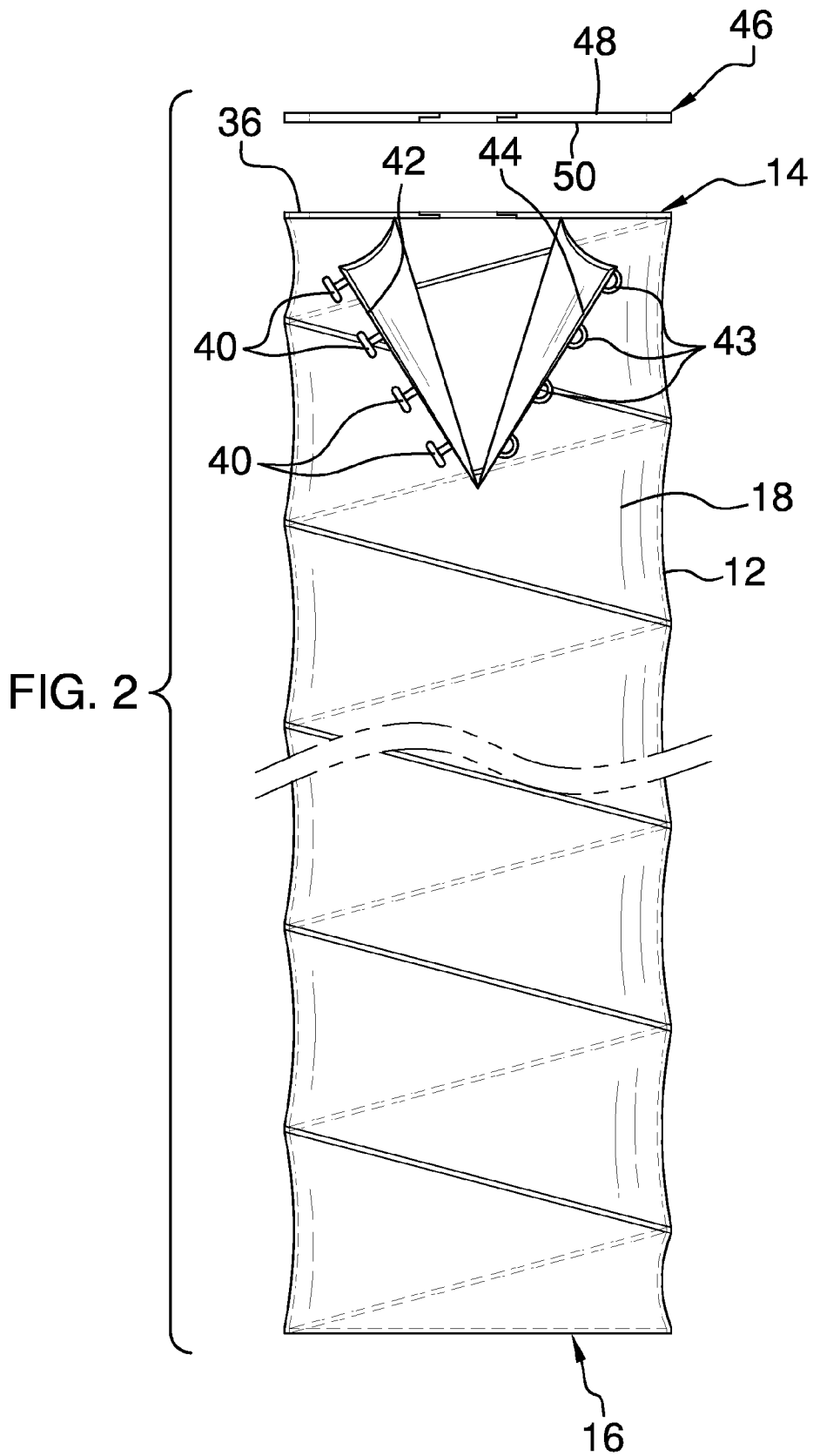

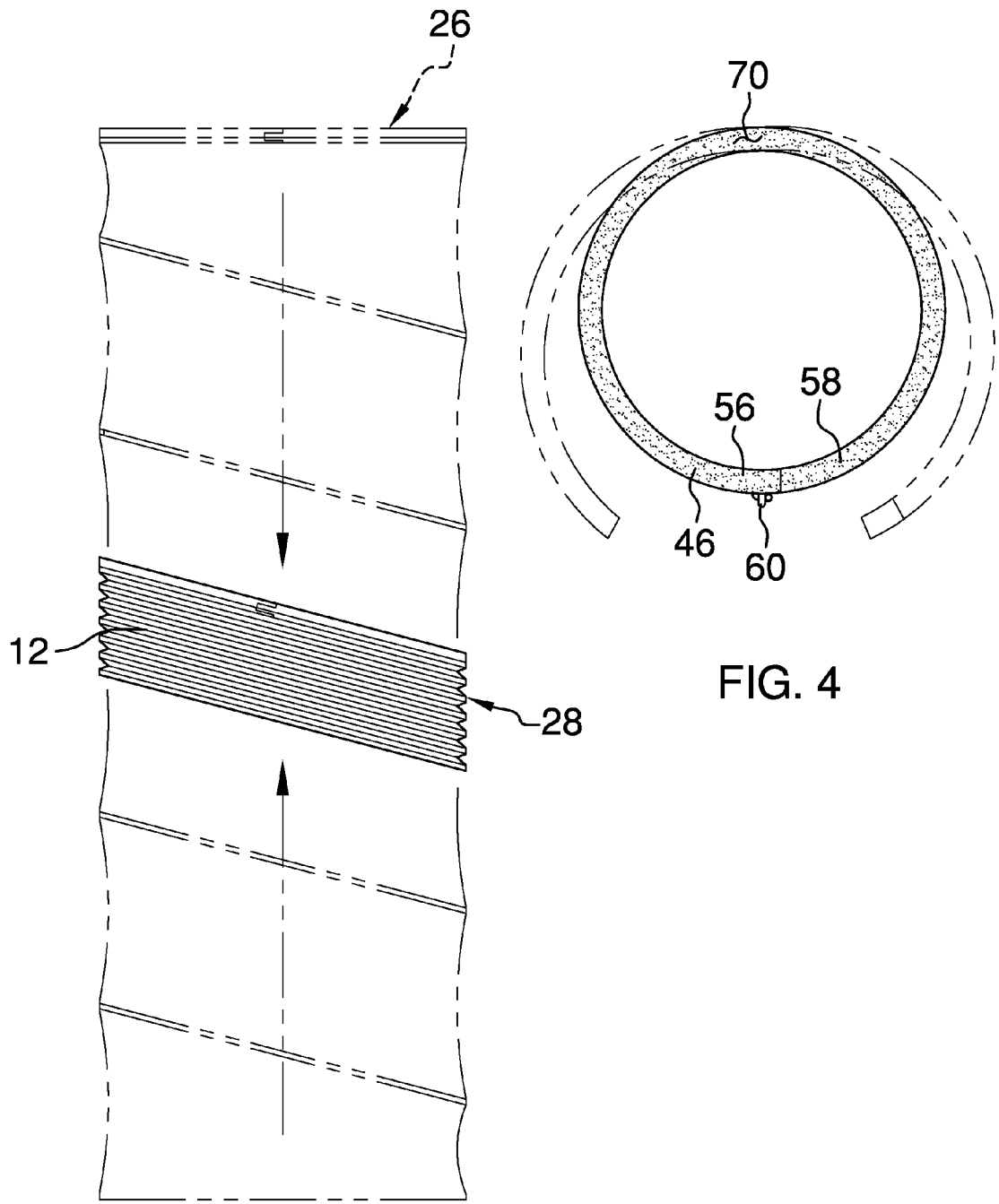

DEBRIS COLLECTING CHUTE DEVICE

BACKGROUND OF THE DISCLOSURE

Field of the Disclosure

The disclosure relates to debris collecting devices and more particularly pertains to a new debris collecting device for facilitating the collection of debris while repairing sheetrock on a ceiling surface.

SUMMARY OF THE DISCLOSURE

An embodiment of the disclosure meets the needs presented above by generally comprising a tube having an open top end, an open bottom end and a perimeter surface coupled to and extending between the open top end and the open bottom end. The open bottom end of the tube is configured for positioning over an open top of a waste receptacle. An attachment member has an upper surface and a lower surface. The upper surface of the attachment member is coupled to the open top end of the tube. The lower surface of the attachment member is configured for attaching to a ceiling surface surrounding a damaged area of the ceiling surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a debris collecting chute device according to an embodiment of the disclosure.

FIG. 2 is a front view of an embodiment of the disclosure.

FIG. 3 is a front view of an embodiment of the disclosure showing the chute in both the expanded position and the collapsed position.

FIG. 4 is a top view of an embodiment of the disclosure.

DESCRIPTION OF THE PREFERRED EMBODIMENT

Figure 5:
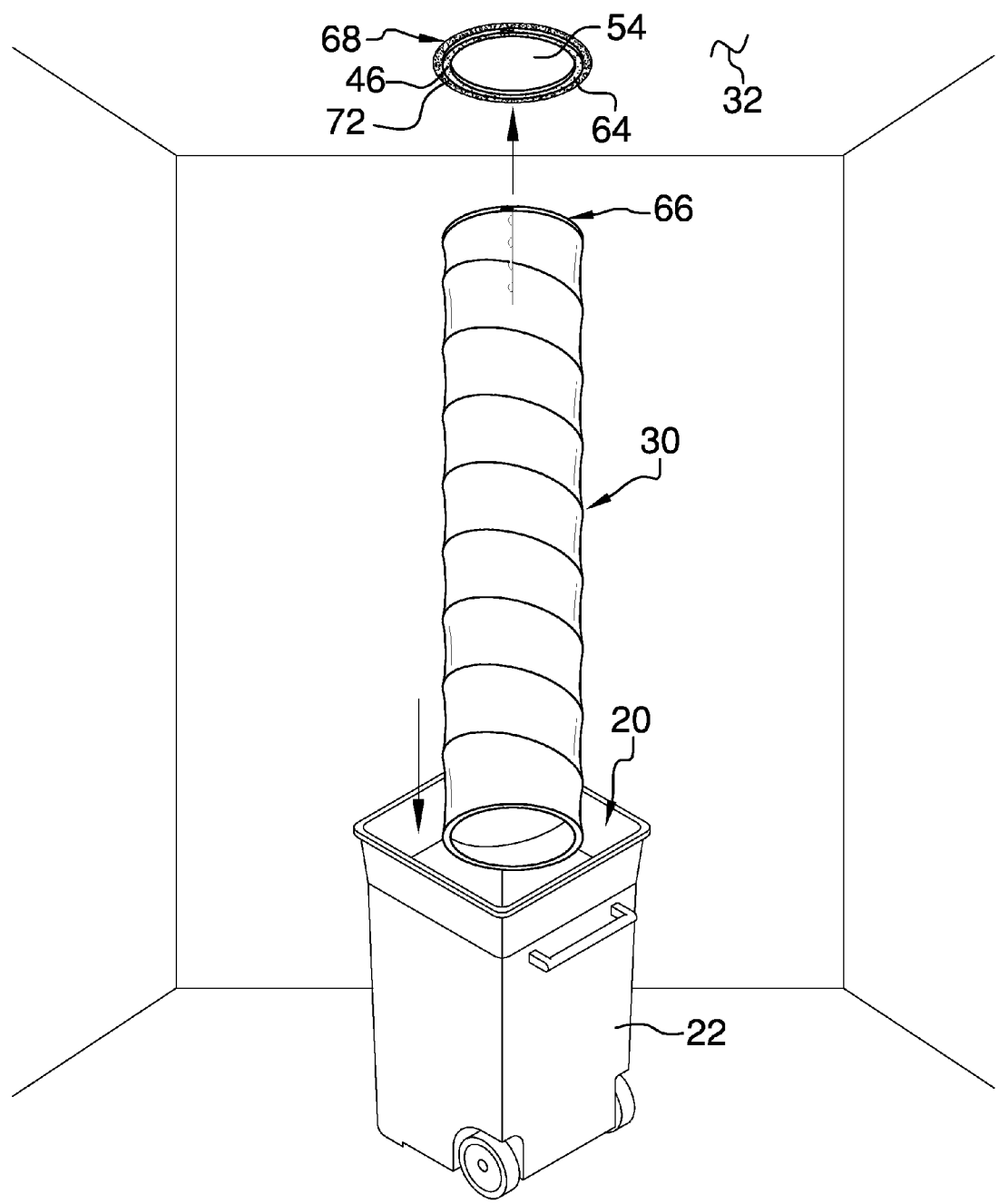
FIG. 5 is an in-use perspective view of an embodiment of the disclosure.

With reference now to the drawings, and in particular to FIGS. 1 through 5 thereof, a new debris collecting device embodying the principles and concepts of an embodiment of the disclosure and generally designated by the reference numeral 10 will be described.

As best illustrated in FIGS. 1 through 5, the debris collecting chute device 10 generally comprises a tube 12 having an open top end 14, an open bottom end 16 and a perimeter surface 18 coupled to and extending between the open top end 14 and the open bottom end 16. The open bottom end 16 is configured for positioning over an open top 20 of a waste receptacle 22. The tube 12 is flexible.

A plurality of spaced accordion pleats 24 is positioned on and extends around a circumference of the perimeter surface 18 between the open top end 14 and the open bottom end 16 of the tube 12 wherein the tube 12 is positionable in an expanded position 26 and a collapsed position 28. The tube 12 is configured to provide a chute 30 for directing debris from the ceiling surface 32 into the waste receptacle 22 when the tube 12 is in the expanded position 26. The tube 12 may have a length between approximately 180.0 cm and 250.0 cm when positioned in the expanded position 26.

A slit 34 extends into the perimeter surface 18 of the tube 12. The slit 34 extends downwardly into an upper edge 36 of the open top end 14 of the tube 12. The slit 34 permits adjustment of a diameter of the open top end 14 of the tube 12. At least one closure 38 is coupled to the tube 12. The closure 38 is selectively actuated to a closed state to close the slit 34. The closure 38 may be one of a plurality of closures 38. Each of the closures 38 is vertically aligned along a length of the slit 34. Each of the closures 38 comprises a first mating member 40 coupled to a first side edge 42 of the slit 34 and a second mating member 43 coupled to a second side edge 44 of the slit 34. The closures 38 may comprise clasps, snaps or the like.

An attachment member 46 has an upper surface 48 and a lower surface 50. The upper surface 48 of the attachment member 46 is coupled to the open top end 14 of the tube 12. The lower surface 50 of the attachment member 46 is configured for attaching to the ceiling surface 32 surrounding a damaged area 54 of the ceiling surface 32. The attachment member 46 may be comprised of a non-slip material, such as rubber or the like. The attachment member 46 may comprise a ring. A diameter of the attachment member 46 is selectively adjustable. In particular, the diameter of the attachment member 46 may be adjusted to have a size between approximately 55.0 cm and 90.0 cm. The attachment member 46 has a break therein defining a first portion 56 and a second portion 58. A fastener 60 is coupled to the attachment member 46. The fastener 60 releasably couples the first portion 56 to the second portion 58. The fastener 60 may comprise a clasp, snaps or the like.

A first coupler 62 releasably couples the attachment member 46 and the tube 12. The first coupler 62 comprises a first mating member 64 coupled to a lower surface 50 of the attachment member 46 and a second mating member 66 coupled to the upper edge 36 of the open top end 14 of the tube 12. The first coupler 62 may comprise a hook and loop coupler. A second coupler 68 is coupled to the attachment member 46. The second coupler 68 is configured to attach the attachment member 46 to the ceiling surface 32. The second coupler 68 includes a first portion 70 of hook and loop coupler positioned on and covering the upper surface 48 of the attachment member 46 and a second portion 72 of hook and loop coupler attachable to the ceiling surface 52. The first 70 and second 72 portions of hook and loop coupler are complementary relative to each other.

In use, as stated above and shown in the Figures, a diameter of the attachment member 46 is adjusted to correspond to a size of a damaged area 54 of the ceiling surface 32. The attachment member 46 is then attached to the ceiling surface 32 using second coupler 68 so that the attachment member surrounds the damaged area 54 of the ceiling surface 32. The attachment member 46 is then attached to the upper edge 36 of the tube 12 using the first coupler 62. The open bottom end 16 of the tube 12 is positioned over an open top 20 of a waste receptacle 22. Debris from the damaged area 54 is then scraped in a conventional manner into the tube 12 wherein the tube 12 forms a chute 30 directing the debris into the waste receptacle 22 without creating a mess. The slit 34 provides an access opening to allow the user's hand and a desired scraping tool to extend therein.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A debris collecting chute device comprising:
   a tube having an open top end, an open bottom end and a perimeter surface coupled to and extending between said open top end and said open bottom end, said open bottom end of said tube being configured for positioning over an open top of a waste receptacle; and
   an attachment member having an upper surface and a lower surface, said upper surface of said attachment member being coupled to said open top end of said tube, said lower surface of said attachment member being configured for attaching to a ceiling surface surrounding a damaged area of the ceiling surface.

2. The device of claim 1, further comprising said tube being flexible.

3. The device of claim 1, further comprising wherein said attachment member comprises a ring.

4. The device of claim 1, further comprising a diameter of said attachment member being selectively adjustable.

5. The device of claim 4, further comprising:
   said attachment member having a break therein defining a first portion and a second portion; and
   a fastener coupled to said attachment member, said fastener releasably coupling said first portion to said second portion.

6. The device of claim 5, further comprising wherein said fastener is a clasp.

7. The device of claim 1, further comprising said attachment member being comprised of a non-slip material.

8. The device of claim 1, further comprising a first coupler releasably coupling said attachment member and said tube.

9. The device of claim 8, further comprising wherein said first coupler comprises a first mating member coupled to said lower surface of said attachment member and a second mating member coupled to an upper edge of said open top end of said tube.

10. The device of claim 9, further comprising said first coupler comprising a hook and loop coupler.

11. The device of claim 1, further comprising a second coupler coupled to said attachment member, said second coupler being configured to attach said attachment member to the ceiling surface.

12. The device of claim 11, further comprising wherein said second coupler is positioned on and covers said upper surface of said attachment member.

13. The device of claim 12, further comprising said second coupler including a first portion of hook and loop coupler.

14. The device of claim 1, further comprising a second coupler coupled to said attachment member, said second coupler including a first portion of hook and loop coupler positioned on and covering said upper surface of said attachment member and a second portion of hook and loop coupler attachable to the ceiling surface, said first and second portions of hook and loop coupler being complementary relative to each other.

15. The device of claim 1, further comprising a plurality of spaced accordion pleats positioned on and extending around a circumference of said perimeter surface wherein said tube is positionable in an expanded position and a collapsed position, said tube being configured to provide a chute for directing debris from the ceiling surface into the waste receptacle when said tube is in the expanded position.

16. The device of claim 1, further comprising a slit extending into said perimeter surface of said tube, said slit extending downwardly from an upper edge of said open top end of said tube, said slit permitting adjustment of a diameter of said open top end of said tube.

17. The device of claim 16, further comprising at least one closure coupled to said tube, said closure being selectively actuated to a closed state to close said slit.

18. The device of claim 17, further comprising said closure being one of a plurality of said closures, each of said closures being vertically aligned along a length of said slit.

19. The device of claim 18, further comprising each of said closures comprising a first mating member coupled to a first side edge of said slit and a second mating member coupled to a second side edge of said slit.

20. A debris collecting chute device comprising:
   a tube having an open top end, an open bottom end and a perimeter surface coupled to and extending between said open top end and said open bottom end, said open bottom end of said tube being configured for positioning over an open top of a waste receptacle, said tube being flexible;
   a plurality of spaced accordion pleats positioned on and extending around a circumference of said perimeter surface wherein said tube is positionable in an expanded position and a collapsed position, said tube being configured to provide a chute for directing debris from a ceiling surface into the waste receptacle when said tube is in the expanded position;
   a slit extending into said perimeter surface of said tube, said slit extending downwardly from an upper edge of said open top end of said tube, said slit permitting adjustment of a diameter of said open top end of said tube;
   at least one closure coupled to said tube, said closure being selectively actuated to a closed state to close said slit, said closure being one of a plurality of said closures, each of said closures being vertically aligned along a length of said slit, each of said closures comprising a first mating member coupled to a first side edge of said slit and a second mating member coupled to a second side edge of said slit;
   an attachment member having an upper surface and a lower surface, said upper surface of said attachment member being coupled to said open top end of said tube, said lower surface of said attachment member being configured for attaching to the ceiling surface surrounding a damaged area of the ceiling surface, said attachment member comprising a ring, a diameter of said attachment member being selectively adjustable, said attachment member having a break therein defining a first portion and a second portion, said attachment member being comprised of a non-slip material;

a fastener coupled to said attachment member, said fastener releasably coupling said first portion to said second portion, said fastener comprising a clasp;

a first coupler releasably coupling said attachment member and said tube, said first coupler comprising a first mating member coupled to said lower surface of said attachment member and a second mating member coupled to said upper edge of said open top end of said tube, said first coupler comprising a hook and loop coupler; and a second coupler coupled to said attachment member, said second coupler being configured to attach said attachment member to the ceiling surface, said second coupler including a first portion of hook and loop coupler positioned on and covering said upper surface of said attachment member and a second portion of hook and loop coupler attachable to the ceiling surface, said first and second portions of hook and loop coupler being complementary relative to each other.

* * * * *